(12) United States Patent
Hubner et al.

(10) Patent No.: US 9,117,204 B2
(45) Date of Patent: Aug. 25, 2015

(54) METHOD AND APPARATUS FOR GROUP COORDINATION OF CALENDAR EVENTS

(75) Inventors: Paul Hubner, McKinney, TX (US);
Kristopher Pate, Flower Mound, TX (US); Steven T. Archer, Dallas, TX (US); Robert A. Clavenna, Lucas, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 639 days.

(21) Appl. No.: 12/895,243

(22) Filed: Sep. 30, 2010

(65) Prior Publication Data

US 2012/0084286 A1    Apr. 5, 2012

(51) Int. Cl.
*G06F 17/30* (2006.01)
*G06Q 10/10* (2012.01)

(52) U.S. Cl.
CPC ................... *G06Q 10/1093* (2013.01)

(58) Field of Classification Search
CPC .................................................. G06Q 10/1093
USPC ........................................................ 707/737
See application file for complete search history.

(56) References Cited

U.S. PATENT DOCUMENTS

| | | | |
|---|---|---|---|
| 7,584,114 B2 * | 9/2009 | Estrada et al. | 705/7.23 |
| 8,359,356 B2 * | 1/2013 | Belz et al. | 709/206 |
| 8,412,675 B2 * | 4/2013 | Alvarado et al. | 707/616 |
| 2004/0143472 A1 * | 7/2004 | Estrada et al. | 705/8 |
| 2006/0190313 A1 * | 8/2006 | Lu | 705/8 |
| 2009/0100332 A1 * | 4/2009 | Kanjilal et al. | 715/235 |
| 2009/0319940 A1 * | 12/2009 | Flake et al. | 715/781 |
| 2011/0178869 A1 * | 7/2011 | Ravichandran et al. | 705/14.49 |
| 2011/0231280 A1 * | 9/2011 | Farah | 705/26.8 |
| 2011/0252351 A1 * | 10/2011 | Sikora et al. | 715/769 |
| 2011/0314115 A1 * | 12/2011 | Nagaraj | 709/206 |
| 2012/0036444 A1 * | 2/2012 | Andersen | 715/738 |

* cited by examiner

*Primary Examiner* — Hosain Alam
*Assistant Examiner* — Navneet K Gmahl

(57) ABSTRACT

An approach for managing calendar information received from a plurality of data sources is described. Calendar information associated respectively with a plurality of data sources is retrieved by a calendar management platform. For each of the data sources, metadata specifying a contributor of the corresponding calendar information and for relating distribution of the calendar information is determined. Based on the first and second metadata, a data view for the calendar information is generated.

18 Claims, 8 Drawing Sheets

METHOD AND APPARATUS FOR GROUP COORDINATION OF CALENDAR EVENTS

BACKGROUND INFORMATION

Typical calendar applications allow users to schedule events, arrangement meetings, plan out tasks and activities and keep track of important dates (e.g., birthdays, anniversaries, etc.). Group and enterprise based calendar applications also are routinely used to facilitate peer-to-peer scheduling of events. For example, a user may schedule a meeting and select a group of attendees from an enterprise list to invite. Each of the attendees selected receive the meeting request to their respective calendar views. Users may also employ entirely different calendar applications to manage their other roles, tasks or responsibilities. For example, a user may use an online calendar for maintaining and scheduling school events while employing an entirely different calendar application for personal or family use. Unfortunately, as independent tools, events posted to one calendar are not automatically applied to the other calendars. Still further, there is no way to coordinate and share calendar information among different associated peers who may also employ a myriad of calendar applications.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

A preferred apparatus, method and software for managing calendar information received from a plurality of data sources is described. In the following description, for the purposes of explanation, numerous specific details are set forth to provide a thorough understanding of the preferred embodiments of the invention. It is apparent, however, that the preferred embodiments may be practiced without these specific details or with an equivalent arrangement. In other instances, well-known structures and devices are shown in block diagram form in order to avoid unnecessarily obscuring the preferred embodiments of the invention.

Although various exemplary embodiments are described with respect to calendar applications, it is contemplated that these embodiments have applicability to any software application capable of receiving input pertaining to events, tasks and activities to be coordinated respective to a specified time frame as well as outputting data pertaining to events, tasks and activities to be coordinated respective to a specified time frame. This includes project management software, personal planning applications, customer relationship management (CRM) tools, event planning software, to-do-list applications, appointment tracking applications, as well as other like technologies that are available for direct execution by a computing device or accessible for operation by a computing device via a network (e.g., online tools).

Figure 1:
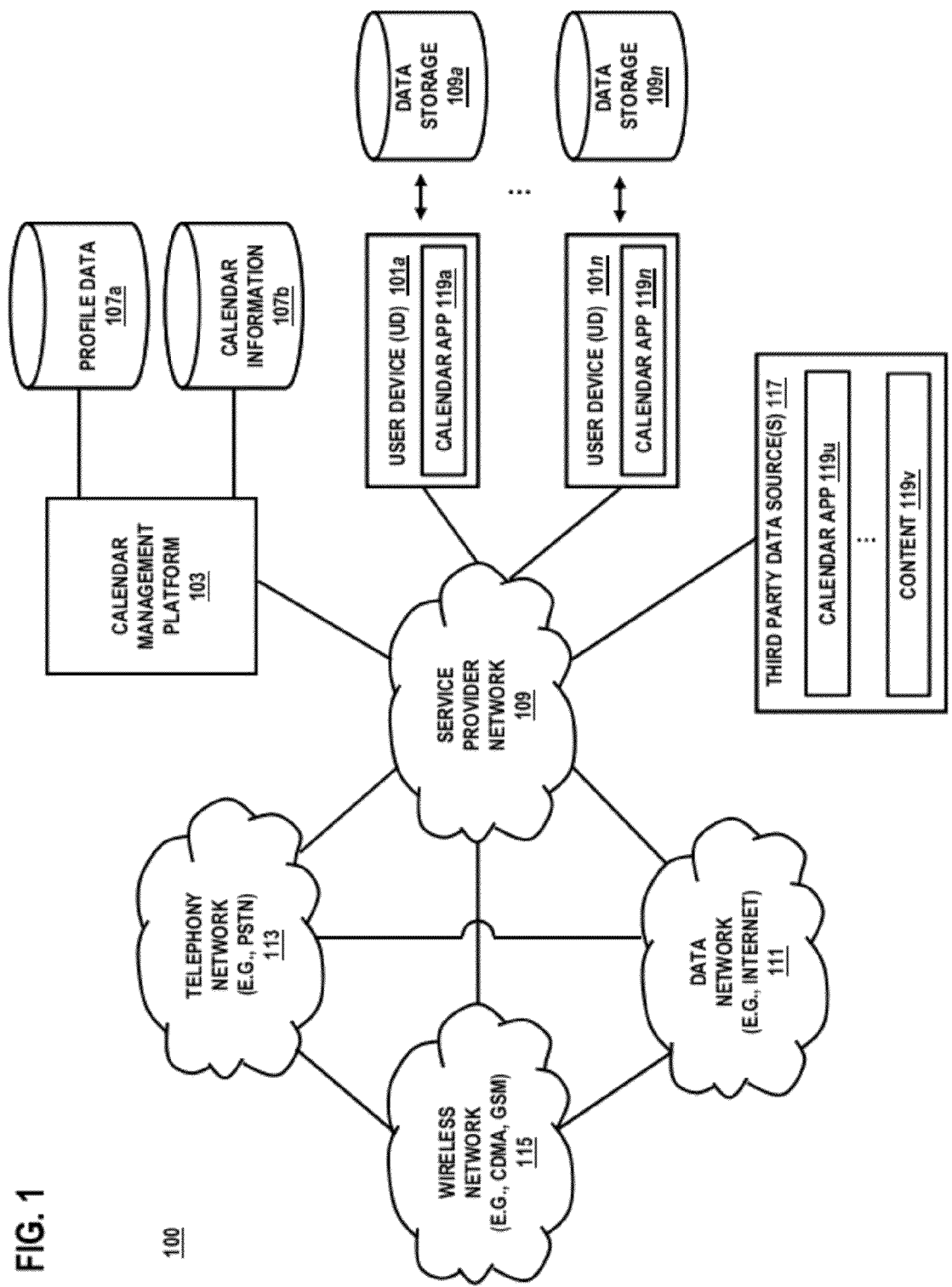
FIG. 1 is a diagram of a system capable of managing calendar information received from multiple data sources, in accordance with an exemplary embodiment.

FIG. 1 is a diagram of a system capable of managing calendar information received from multiple data sources, in accordance with an exemplary embodiment. In various embodiments, a plurality of data sources provide calendar information for use with respect to one or more calendar applications available for execution by one or more user devices. A calendar management platform 103, according to certain embodiments, acts as an intermediary service for enabling coordination, arrangement, translation and sharing of calendar information between different calendar applications. In certain embodiments, "data sources" pertain to any device or network location for rendering, generating or conveying calendar information that is useful for execution or use by a calendar application. By way of example, data sources may pertain to one or more user devices $101a$-$101n$ that are configured to provide calendar information as generated by or for a calendar application $119a$-$119n$ of the device. Calendar applications $119a$-$119n$ may be installed directly onto devices $101a$-$101n$ for execution as a standalone or integrated software application.

In another example, data sources may pertain to third party data sources 117, which may comprise one or more servers, application platforms and/or hosted solutions for providing calendar information with respect to a calendar application $119u$. The calendar application $119u$ may be implemented as an online, network or web-based application or service that is accessed from a graphical user interface (GUI) of the user devices $101a$-$101n$. Content $119v$ may also be provided by the third party data source 117 in connection with a calendar application $119u$. By way of example, the third party data source 117 may provide content pertaining to a venue specified in connection with a scheduled event, content pertaining to directions of a location for a scheduled meeting, articles associated with a scheduled task, etc. In certain embodiments, "content" is any data capable of being rendered, presented and/or manipulated by a user device $101a$-$101n$, and particularly that for use in connection with supporting calendar applications $119u$. It is noted in certain instances that content $119v$ may be provided as calendar information, associated with calendar information as metadata, or a combination thereof.

As presented, data sources pertain to both physical user devices $101a$-$101n$ and network based sources 117. For illustration purposes, the term "data sources" will pertain to either of these representations for the conveying and/or generating calendar information unless expressly stated. Also, in certain embodiments, "calendar information" includes any data for use by a calendar application $119a$-$119n$ and $119v$ for representing as an event, task, person, group or activity in association with a schedule. By way of example, data pertaining to a specific event (e.g., meeting, concert or social function) may include a date, a start and end time, a subject or name of the event, a location or physical resource for hosting the event, a recurrence setting, a status setting (e.g., out of office, free, busy), a priority setting, a response urgency, one or more associated users or groups, an event category, a note, or other data. In the context of a calendar application associated with customer relationship management (CRM), project management, production planning or other tools, calendar information may also include customer profile data, sales transaction data, human resource records, work orders, inventory lists, trend data or the like.

Still further, calendar information may also pertain to metadata for enabling execution of a calendar application 119a-119n and 119v. As will be discussed later, the metadata may be useful for specifying a contributor of the corresponding calendar information, relating to distribution of the calendar information, specifying a filter for a type of event to output to a user group according to the distribution, etc. For purposes of illustration, it is assumed that calendar information pertains to any of the above described examples, including metadata, for being applied to or generated by a calendar application 119a-119n and 119u. Calendar information may be stored to a respective data storage 109a-109n of the devices 101a-101n, along with any related content 119v, for subsequent retrieval by respective calendar applications 119a-119n and 119v. Data storage 109a-109n can take various forms of memory, as explained with respect to FIGS. 6 and 7, or be external to the user devices 101a-101n Typically, a user may employ calendar applications for maintaining details regarding their events and/or activities. For example, a user may use an employer or enterprise provided calendar application (e.g., Outlook, Lotus Notes, internal tools) for scheduling and maintaining data regarding work related tasks. Such applications may be configured to the employer's network, therefore enabling calendar information among co-workers and other affiliates (e.g., peers) to be shared readily. Under this scenario, users may post meetings to a calendar for all to see, interact and share meeting and event information, schedule and reserve facility resources, etc. Consequently, interactivity among users around the calendar application is only possible when the users are subscribed to the same network and use the same calendar application. External users, who may also happen to use different calendar applications, cannot readily partake in the shared viewing, scheduling or coordinating of calendar information.

The ability of a single user to exchange relevant calendar information with a plurality of different calendar applications they may execute via their user device 101 is also limited. By way of example, a user may not feel comfortable posting social/non-work related events and activities to the employer provided calendar application due to privacy concerns. However, the user may employ an external calendar application for scheduling personal or social events and activities, such as birthday reminders, parties, scheduled to-dos and social gatherings. The user's calendar application 119a may be installed on their personal computer 101a or may be accessed as through a browser as an online calendar application 119u that is integrated with their social network. As independent and unrelated calendar applications, there is no way for the user to facilitate the exchange of shared calendar information or correlate data entries. Still further, as the functions, formats, capabilities and data types of applications vary, translation of calendar information from one application to another is not easily achieved.

To address this issue, the system of FIG. 1 allows different calendar applications to synchronize and/or share calendar information with one another for affecting both individual and group data views respective to a calendar application. By "data view," it is meant to reference in certain embodiments the presentment of a calendar view inclusive of calendar information for detailing scheduled events. A data view may also pertain to means for rendering to a graphical representation of calendar information, including metadata, in a manner suited for execution by a particular calendar application. Hence, a data view for one type or brand of calendar application may be different than that of another, even though it pertains to the same set of calendar information. This is due to the different design and functional differences between calendar applications. Nonetheless, devices 101a-101n that are actively configured to, registered with or subscribed to a calendar management service—i.e., as maintained by a service provider—can exchange calendar information and metadata associated therewith other users, groups via their different calendar applications; facilitating shared data viewing of relevant calendar information for individual users and peers.

By way of example, the calendar management service may include a calendar management platform 103 that is accessible by user devices 101a-101n over a service provider network 109. The calendar management platform 103 maintains user profile data 107a that is useful for enabling a subscribing user to readily engage others (via their user devices 101) for sharing calendar information, including associated metadata or content 119v, in association with their individual calendar application 119a-n, 119v. In addition, the calendar management platform 103 also maintains calendar information 107b provided by or accessed by the calendar application of the various user devices 101a-101n, so as to perform further analysis and processing of calendar data. As will be discussed later on, for example, the calendar management platform 103 can correlate calendar information of different types of calendar applications. This may include ensuring commonality and mapping of data types, data descriptors, entry fields and data formats. Calendar information 107b as it pertains to a single user or others associated with an event may also be referenced within user profile data 107a (e.g., associated with an established user account), along with a calendar application type. One user profile record 107a can therefore be linked to that of another user (e.g., a peer) for enabling the calendar management platform 103 to facilitate peer-based calendar information sharing and access across different devices and calendar applications.

It is contemplated that user devices 101a-101n may be any type of mobile terminal, fixed terminal, or portable terminal including a mobile handset, station, unit, device, multimedia computer, multimedia tablet, Internet node, communicator, desktop computer, laptop computer, Personal Digital Assistants (PDAs), Smartphone or any combination thereof. Also, user devices 101a-101n can support any type of interface for supporting the presentment of data views respective to one or more different calendar applications. Examples of typical calendar applications 119 may include installed and/or network solutions such as Microsoft® Outlook or Lotus Notes, online tools such as Google Calendar, e-mail editor based calendar applications, event planning tools such as Evites and various proprietary scheduling systems. In general, user devices 101a-101n may feature a browser or portal application for enabling network communication and access to content 119v and online calendar applications 119u. In addition, user devices 101a-101n may facilitate various input means for receiving and generating calendar information, including touch screen capability, keyboard and keypad data entry, voice-based input mechanisms and the like. Any known and future implementations of user devices 101 are applicable.

In certain embodiments, user devices 101a-101n, the calendar management platform 103 and other elements of system 100 may be configured to communicate via a service provider network 109. According to certain embodiments, one or more networks, such as data network 111, telephony network 113, and/or wireless network 115, can interact with the service provider network 109. Networks 109-115 may be any suitable wireline and/or wireless network, and be managed by one or more service providers. For example, telephony network 113 may include a circuit-switched network, such as the public switched telephone network (PSTN), an integrated services digital network (ISDN), a private branch exchange (PBX), or other like network. Wireless network 115 may employ various technologies including, for example, code division multiple access (CDMA), enhanced data rates for global evolution (EDGE), general packet radio service (GPRS), mobile ad hoc network (MANET), global system for mobile communications (GSM), Internet protocol multimedia subsystem (IMS), universal mobile telecommunications system (UMTS), etc., as well as any other suitable wireless medium, e.g., microwave access (WiMAX), wireless fidelity (WiFi), satellite, and the like. Meanwhile, data network 111 may be any local area network (LAN), metropolitan area network (MAN), wide area network (WAN), the Internet, or any other suitable packet-switched network, such as a commercially owned, proprietary packet-switched network, such as a proprietary cable or fiber-optic network.

Although depicted as separate entities, networks 109-115 may be completely or partially contained within one another, or may embody one or more of the aforementioned infrastructures. For instance, service provider network 109 may embody circuit-switched and/or packet-switched networks that include facilities to provide for transport of circuit-switched and/or packet-based communications. It is further contemplated that networks 109-115 may include components and facilities to provide for signaling and/or bearer communications between the various components or facilities of system 100. In this manner, networks 109-115 may embody or include portions of a signaling system 7 (SS7) network, or other suitable infrastructure to support control and signaling functions.

According to exemplary embodiments, end user devices (not shown) may be utilized to communicate over system 100 and may include any customer premise equipment (CPE) capable of sending and/or receiving information over one or more of networks 109-115. For instance, voice terminal may be any suitable plain old telephone service (POTS) device, facsimile machine, etc., whereas mobile device (or terminal) may be any cellular phone, radiophone, satellite phone, smart phone, wireless phone, or any other suitable mobile device, such as a personal digital assistant (PDA), pocket personal computer, tablet, customized hardware, etc. Further, computing device may be any suitable computing device, such as a VoIP phone, skinny client control protocol (SCCP) phone, session initiation protocol (SIP) phone, IP phone, personal computer, softphone, workstation, terminal, server, etc.

It is noted, though not shown in the figure, that in certain embodiments user devices 101a-101n may be configured to establish connectivity with one another via a local area network (LAN) for providing one or more wireless connections. By way of example, a group of user devices 101a-101n may be configured to a common LAN so that each device can be uniquely identified via any suitable network addressing scheme. For example, the LAN may utilize the dynamic host configuration protocol (DHCP) to dynamically assign "private" DHCP internet protocol (IP) addresses to each user device 101, i.e., IP addresses that are accessible to devices connected to the service provider network 109 as facilitated via a router.

Figure 2:
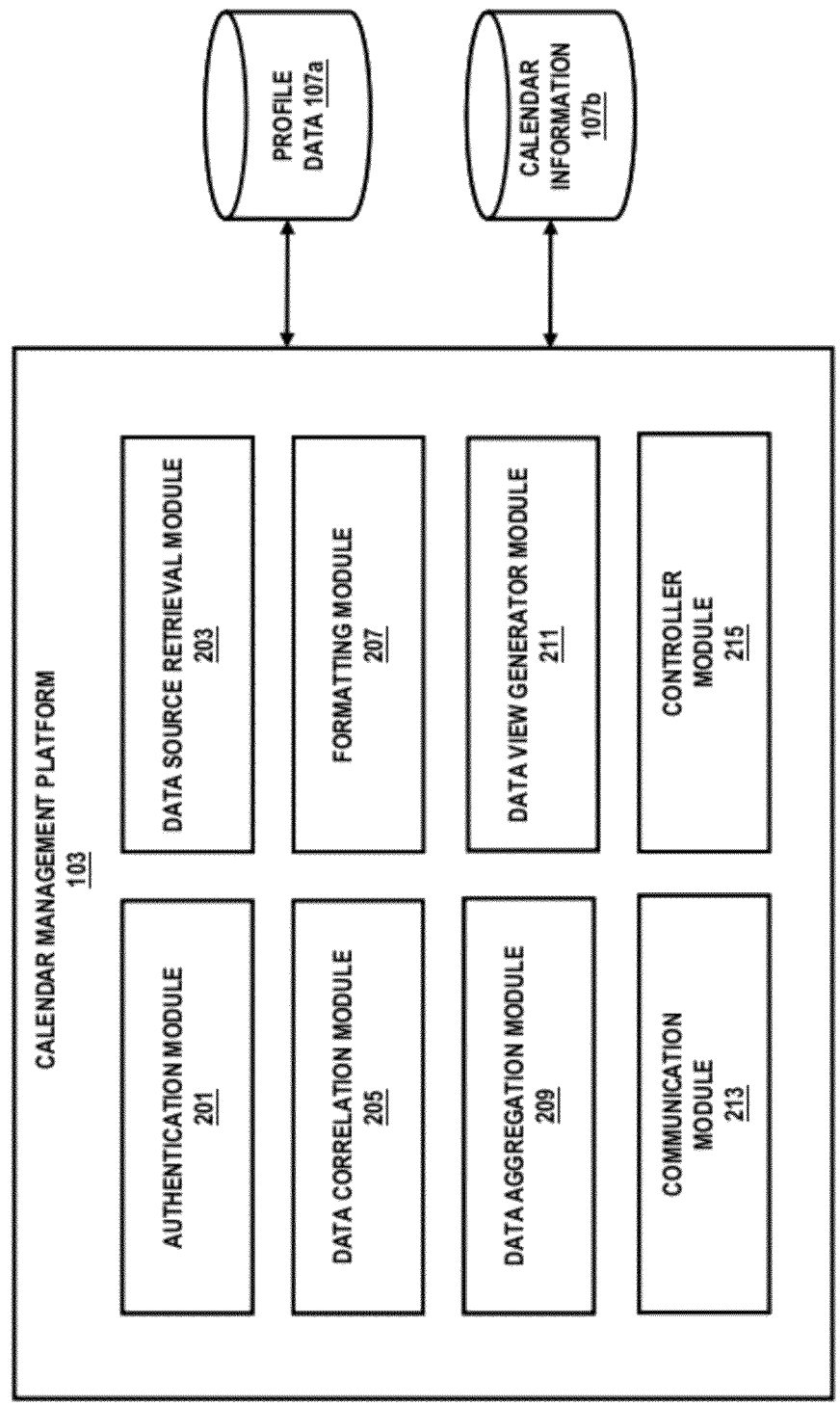
FIG. 2 is a diagram of a calendar management platform for enabling the sharing of calendar information between one or more devices for executing different calendar applications, in accordance with an exemplary embodiment.

FIG. 2 is a diagram of a calendar management platform for enabling the sharing of calendar information between one or more devices for executing different calendar applications, in accordance with an exemplary embodiment. The calendar management platform 103 includes various executable modules for performing one or more computing, data processing and network based instructions that in combination provide a means of facilitating shared execution and use of calendar information across users, user groups and/or different calendar applications. Such modules can be implemented in hardware, firmware, software, or a combination thereof. By way of example, the calendar management platform 103 may include an authentication module 201, a data source retrieval module 203, a data correlation module 205, a formatting module 207, a data aggregation module 209, a data view generator module 211, a communication module 213 and a controller module 215.

In one embodiment, the authentication module 201 authenticates users and user devices 101a-101n for interaction with the calendar management platform 103. By way of example, the authentication module 201 receives a request to subscribe to a calendar service for receiving the data view of a specific user. The request may pertain to the receiving of a data view for a calendar of the requesting user or another user configured to the calendar management platform 103 via the service provider network 109. Authentication may include receiving and validating a login name and/or user identification value as provided or established for a particular user during a subscription or registration process with the service provider. The login name and/or user identification value may be received as input from a user device 101 via a graphical user interface presented to a user by the calendar management platform 103 (e.g., by a user interface module (not shown)).

Access by a user to a different user's calendar or to a different calendar application of said user, i.e., as representative different data views, may be performed based on a permission or affiliation basis. Under this scenario, restrictions or permissions may be allowed based on a common reference identifier or other value. By way of example, one permission setting may enforce that only users with common events—i.e., that are tagged with the same calendar identifier value—may be correlated and enabled access to differing data views. Another permission setting may call for common affiliation, wherein only users and/or events belonging to the same group are enabled access on differing data views. Additionally, users may feature a common tag representative of the group to which they mutually belong, such as a work group, planning group, team, family name, department, or any other designation. In another example, the authentication module 201 may rely on a device identifier associated with a user device 101. Tags, identifiers and other data pertaining to a user or users may be referenced by the authentication module 201 in a user profile 107a accordingly. It is noted that the authentication module 201 may facilitate first time calendar management service subscriptions as well as authenticate/coordinate peer data view accessibility. It is also noted that the authentication module 201 authenticates/coordinates accessibility of data views associated with the various calendar applications of use by a single user.

In one embodiment, a data source retrieval module periodically synchronizes with data sources (e.g., 101a-101n, 117) to retrieve calendar information pertaining to a user and/or related peers. Periodicity settings may be established as part of a user profile 107a. Data retrieval may include acquiring calendar information input by peers, at their respective user devices 101, for inclusion in a data view of another user's calendar. This may also include retrieving calendar information input by the user to a calendar application 119 at the user device 101, for inclusion in a data view of a different calendar application of the users. By way of example, when a subscribing user inputs calendar information representative of an event into a calendar application at their disposal, the module 203 retrieves this data and stores it as calendar information 107b in connection with a particular user profile. As another example, when a peer inputs calendar information representative of a group event associated with multiple different users, the module 203 retrieves and stores the data as calendar information 107b in connection with all applicable user profiles 107a.

Still further, the data source retrieval module 203 can retrieve third party content specified by a user in their profile that is associated with calendar information. By way of example, the content may include really simple syndication (RSS) feed data, media data, subscription based content, maps/directional data, etc. As mentioned previously, such third party content may be integrated for use in connection with calendar information for impacting the data view. The types of content, sources thereof and means of presentment of said content relative to a data view will vary depending on features and functions of the calendar application 119 as well as the services to which the user subscribes. It is noted that the data source retrieval module 203 may be configured to retrieve profile data 107a indicative of a given calendar application type or brand employed by the user, file convention information and any other data that can be used to accommodate varying data needs.

In one embodiment, a data correlation module 205 parses and correlates various data types received as calendar information 107b from different data sources (e.g., user devices 101a-101n, third party data sources 117). By way of example, different calendar applications 119a-119n feature similar and at times different data types, data fields and descriptors. In addition, different applications may generate calendar information 107b and maintain records conforming to differing file formats. Hence, data types, fields and descriptors from one calendar application are mapped by the data correlation module 205 to different calendar applications for enabling seamless aggregation of data types and proper exchange of calendar information. Also, the data correlation module 205 ensures compatibility of file types. By way of example, calendar application file types correlated or aligned by the data correlation module 205 for mobile based applications, computer applications and web based applications may include iCal, *.ICS, *.CAL, *.DAT, *.DBA, *.CBF, *.CCE, *.CE, *.DP, *.MPC, *.ORG, *.XML, *.JS, text and ASCII file formats. It is noted that the data correlation module 205 is configured to perform data mapping and normalization of calendar information data types.

It is further noted that the data correlation module 205 may also correlate calendar information received from a multitude of data sources with the user profiles of peers. For example, if a particular data field is received as calendar information for two different users, the correlation module 205 can correlate the user profiles of the different users based on the common occurrence of the data field. By way of example, the correlation may be on the basis of a common group identifier, event identifier, company designation, etc.

Also operable in connection with the data correlation module 205 is the formatting module 207. In one embodiment, the formatting module 207 conditions the received calendar information 107b to be passed along to other calendar applications for execution in accord with multiple output formats, including E-ink, PDF, JPEG, etc. While this execution can be performed concurrently with the data correlation module 205, the formatting module 207 also accounts for the unique placement of data items for affecting a data view. By way of example, when information is presented in a particular order in a data view associated with one calendar application, the formatting module 207 conditions calendar information generated by a different application so that it conforms to this data view. Actions performed by the formatting module 207 may include the rendering and placement of graphic elements to a display of a user devices 101a-101n, the rendering and placement of textual data, color and contextual features and other graphic primitives that influence a data view. Of particular note, the formatting module 207 ensures data views for a given application are maintained properly with respect to different calendar applications despite the type of calendar information 107b received from the data sources.

In one embodiment, the data aggregation module 209 merges, updates and generates the correlated calendar information into a final data set for use in generating a data view. By way of example, a data view may include presentment of multiple event entries against a weekly or monthly calendar view. When event entries are contributed by various data sources for inclusion with a user's data view, these events are aggregated and compiled accordingly by the data aggregation module 209. As another example, a single event represented as calendar information for a user may be updated to reflect changes (e.g., addition or subtraction of data) for impacting presentment of that event as a data view. Changes may include a rescheduled date or time, a changed location, added notes or document attachments, an updated meeting attendee list or status, etc. All data required for generating a data view is aggregated and when required, transcoded accordingly by the data aggregation module 209 to ensure accurate portrayal of scheduled activities.

In one embodiment, a data view generator module 211 compiles the aggregated calendar information 107b into a data view corresponding to a particular user and enables outputting of the data view to user devices 101. Per the formatting module 207, the data view is generated and presented as required for the particular calendar applications of one or more receiving users as directed by the data view generator module 211. The data view generator module 211 may access various application programming interfaces (APIs) and other functions for facilitating presentment of data relative to the operating system of the executing user device 101. Of note, the data view generation module 211 also allows users to switch between multiple online calendar aggregations for a particular user. For example, a data view conforming to a first calendar application of the user and a second data view conforming to a second calendar application of the same user is provided by the data view generator module 211. By generating different data views, the user is able to view data according to their particular calendar viewing preference. Each view, though conforming to a different calendar application, can feature the same aggregated calendar information (e.g., events, tasks, reminders) as the other.

It is noted that while multiple different data views may be generated for a user corresponding to a user profile (e.g., the user employs multiple different calendar applications), other peers authenticated accordingly by the authentication module 201 may also be given permission to view the user's calendars. Under this scenario, the data view generator module 211 generates a view corresponding to the various different calendar applications of the authorized peers, where each peer is associated with a unique user profile 107a. The data views generated for the peers by the module 211 will include calendar information as aggregated for the peer and the user.

In one embodiment, the various protocols, data sharing techniques and the like required for enabling collaborative execution between user devices 101a-101n over the communication network defined by one or more combinations of networks 109-115 is provided by way of a communication module 213. As the various user devices 101a-101n may feature different communication means, the communication module 213 allows the calendar management platform 103 to adapt to these needs respective to the required protocols of the network 109. In addition, the communication module 213 may appropriately package data for effective receipt by respective user devices 101a-101n. By way of example, the communication module 213 packages data views generated by module 211 for transmission to respective user devices 101.

In certain embodiments, a controller module 215 is configured to regulate the communication processes between the various modules 201-213, including data exchange and timing control where appropriate. The controller module 215 may also facilitate the pushing and pulling of data to and from the various databases 107a and 107b as required for execution of a particular module 201-213. Also, the controller module 215 generates the appropriate signals to control the communication module 213 for transmission over the service provider network 109 to which a telephony network 113 may be implemented. The carrier network, such as in the case of the user device 101a being a mobile phone, may be configured by way of the telephony 113 or wireless network 115 to enable radio frequency (RF) communication. Alternatively, in the case of the user device 101a being a computing device such as a laptop, tablet personal computer or the like, the controller module 215 facilitates execution of control signals via the communication module 213 via the data network 111 appropriately.

As mentioned previously, the calendar management platform 103 maintains user profile data 107a that is useful for enabling a subscribing user/device to readily engage participant users/devices for sharing synchronized content. While contents of the user profile has been indicated throughout, in general the user profile data 107a may include data for characterizing and defining a user, including the user's role (father, coach, student, grandparent, etc.), group affiliations (e.g., family, team, accounting team, book club), peer users associated with a given group, identifier values, user related statistics and preference data, contact information, authentication codes and values, etc. The user profile 107a may also indicate device profile information for specifying device characteristics and capabilities, such as the amount of memory, type of display, input capability, processing capacity, etc. Other device characteristic data may include device identifier values, calendar application brand and type, file formats, operating system and API characteristics, etc.

Furthermore, the calendar management platform 103 maintains calendar information 107b that is generated by, generated for or related to one or more calendar applications 119a-n and 119v as obtained from various data sources. While discussed throughout, the calendar information includes any data useful for characterizing scheduled events, activities and tasks relative to a time frame. By maintaining profile data 107a and calendar information 107b, specific calendar details may be appropriately associated with individual users and peers for enabling sharing of data views. It is noted, therefore, that the calendar management platform 103 may be provided as a service by a service provider (e.g., wireless services provider, internet service provider, customer relationship management service provider, business intelligence service provider, project management data management service).

Figure 3:
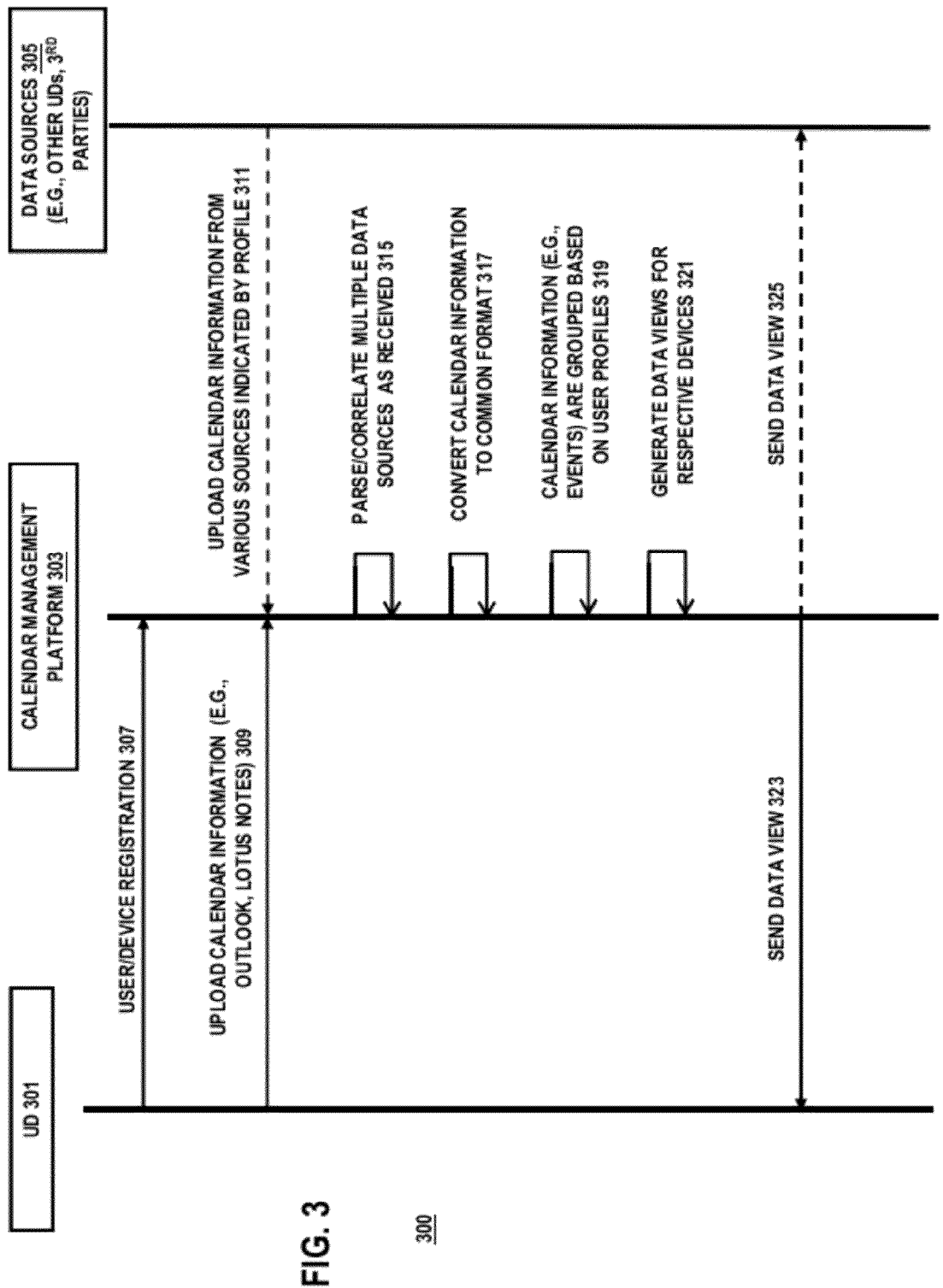
FIG. 3 is a ladder diagram showing a process for enabling the outputting of calendar information, according to an exemplary embodiment.

FIG. 3 is a ladder diagram showing a process for enabling the outputting of calendar information, according to an exemplary embodiment. Under this scenario, interactions can occur over a service provider network 109. In an interaction 307 between the calendar management platform 303 and the user device 301, a user/device registration process 307 is performed, which may include accessing user/device profile data. This may include execution of a first time subscription or authentication process. In another interaction 309, the user device 301 uploads calendar information respective to a calendar application it operates. An alternative or additional interaction 311 between the calendar management platform 303 and other data sources 305 may also occur, where calendar information is uploaded to the calendar management platform 303 by the data sources 305. The data sources may be affiliated with the user based on information maintained in a user profile by the calendar management platform 303.

Upon receipt of calendar information, the various modules 201-215 of the calendar management platform 103 may interact with one another in the manner described above, including parsing/correlating multiple data sources and types as received 315, converting calendar information to a common format 317, grouping calendar information (e.g., events) based on commonality between user profiles 319, and generating data views for group or individual user consumption at respective user devices 321. In another interaction 325, the calendar management platform 303 sends the generated data view to the user device 301. It is noted that in the case of group calendar interaction and sharing, the data views may also be shared with related data sources 305, per interaction 325. This can include sharing of the data view 325 with peer user devices that have an interest in, or relationship to, the user of device 301. The sharing process may be based on permissions settings, for instance. Interactions 323 and 325 between the calendar management platform 303, user device 301 and data sources 305 may be performed automatically upon generation of the data view. Alternatively, the interaction may be performed on a request basis as initiated by a calendar application. In either execution, the received data view enables individual users to view the most pertinent, relevant calendar information for all related peers. It is noted the interactions may facilitate a means of calendar information updating and synchronization across multiple different data sources, user devices and calendar applications for multiple users.

Figure 4B:
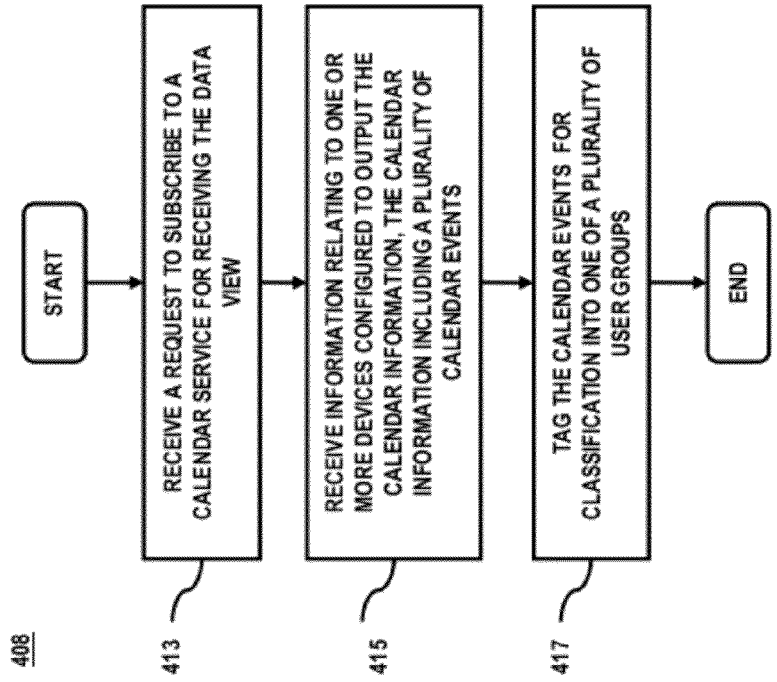
FIGS. 4A and 4B are flowcharts of processes for managing calendar information retrieved from multiple data sources, according to various embodiments.
Figure 4A:
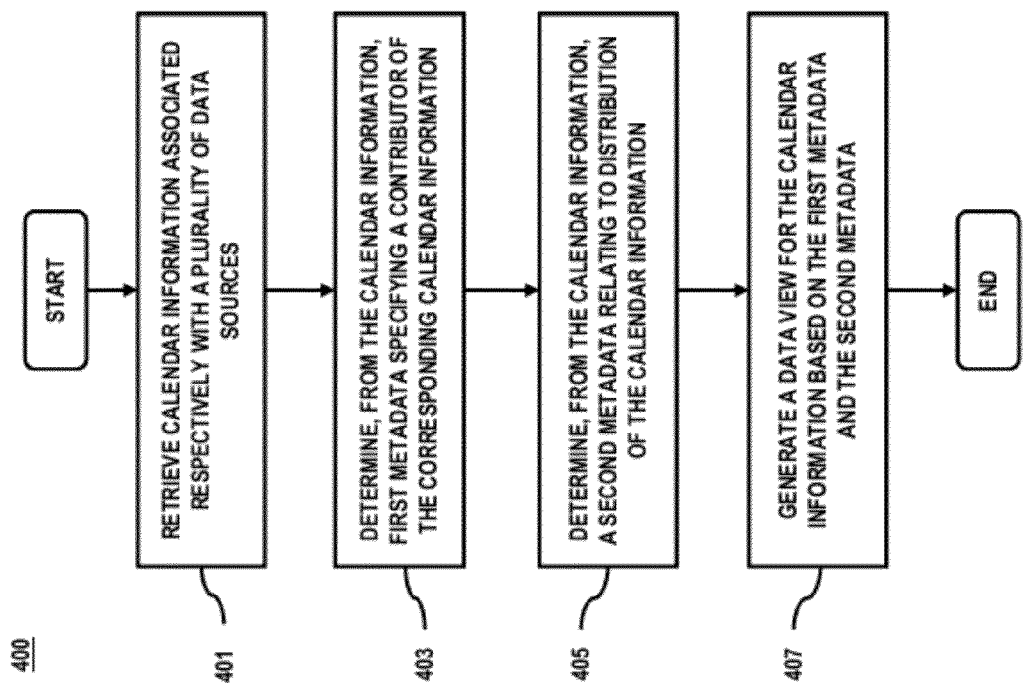

FIGS. 4A and 4B are flowcharts of processes for managing calendar information retrieved from multiple data sources, according to various embodiments. For the purpose of illustration, the processes are described with respect to FIG. 1. It is noted that the steps of the processes 400 and 408 may be performed in any suitable order, as well as combined or separated in any suitable manner. In step 401 of process 400, calendar information is retrieved by a calendar management platform 103 from a plurality of data sources. The data sources may include a plurality of user devices 101a-101n, third party data sources 117, or a combination thereof. In step 403, the calendar management platform 103 determines first metadata, as indicated in the calendar information, specifying a contributor of the corresponding calendar information. By way of example, the contributor may indicate the name, e-mail address, user identifier value or other data for specifying an originator or adjuster of a calendar event, meeting request or activity. Similarly, in step 405, a second metadata relating to distribution of the calendar information is determined. The distribution may pertain to the linking or associating of the calendar information with various peers or data sources.

It is noted that in certain instances, yet another metadata (e.g., a third metadata) specifying a filter for a type of event to output to a user group according to the distribution may be determined from the received calendar information. By filtering users into groups, events may be directed to only users having common defined group characteristics or limited to those having a relation to the designated event. Next, a data view, as in step 407, is generated for the calendar information based on the first metadata and second metadata (and possibly the third metadata). Per execution of modules 205-211 of the calendar management platform 103, the data view is generated to be compatible with one or more different calendar applications at the disposal of a receiving user device. Upon generating the data view, the calendar management platform 103 may initiate transmission of the data view to corresponding devices, such as the user device of a particular user, peers related to the user or the other related data sources.

As shown in FIG. 4B, in step 413 of process 408, the calendar management platform 103 receives a request from a data source (e.g., a user device 101) to subscribe to a calendar service for receiving the data view. In step 415, the calendar management platform 103 also receives information relating to one or more devices configured to output the calendar information. The calendar information includes a plurality of calendar events as generated by various data sources. In step 417, to facilitate distribution of the calendar events, the calendar management platform 103 tags the calendar events for classification into one of a plurality of user groups. The tags may serve as specific data types or descriptors for referencing specific users.

Figure 5A:
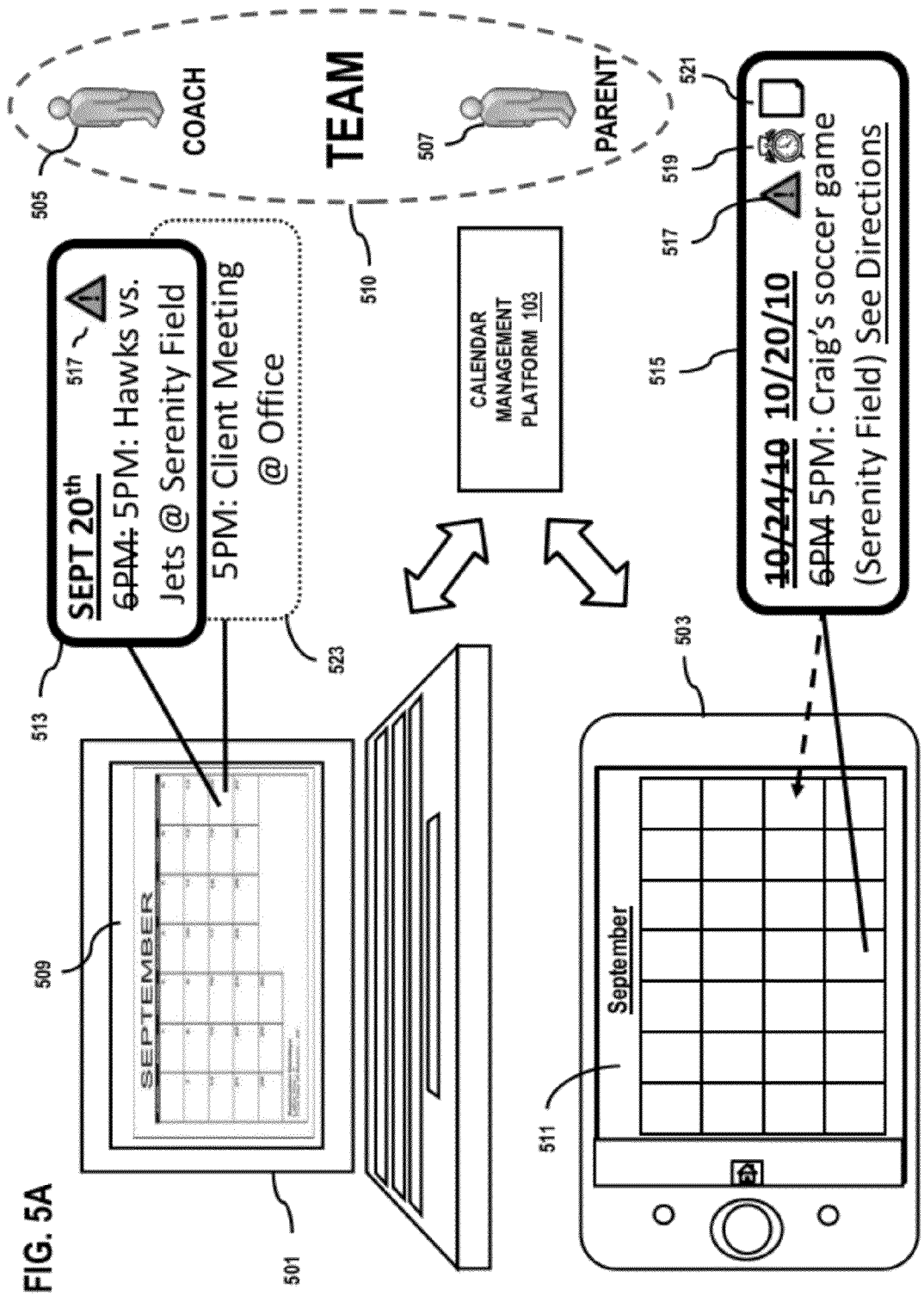
FIGS. 5A and 5B are diagrams of graphical user interfaces (GUIs) of devices for presenting a data view for calendar information, according to an exemplary embodiment.
Figure 5B:
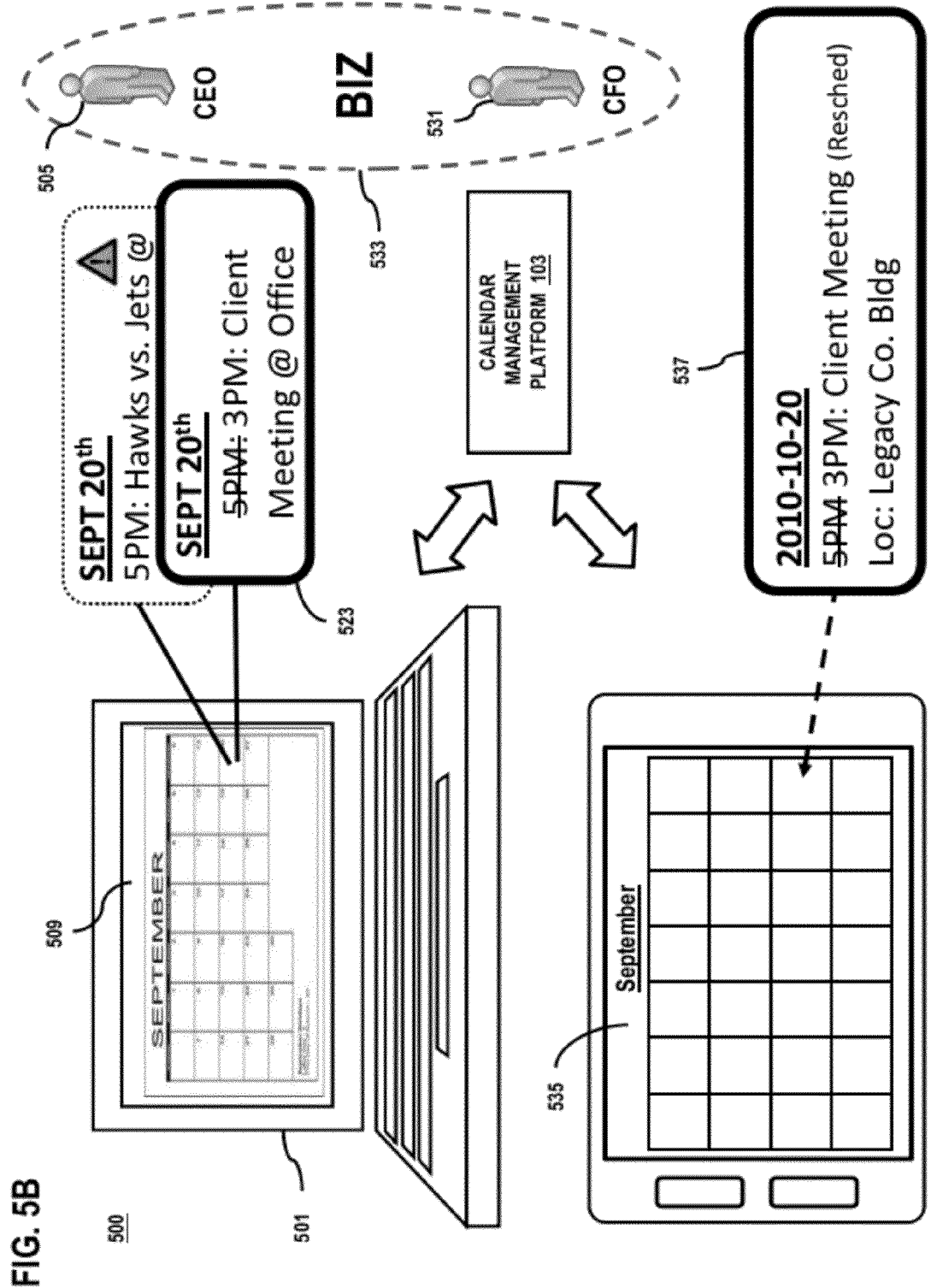

FIGS. 5A and 5B are diagrams of graphical user interfaces (GUIs) of devices for presenting a data view for calendar information, according to an exemplary embodiment. By way of example, execution of the GUIs for devices 501 and 503 are presented from the perspective of an exemplary use case. This use case involves an interaction between a first user 505 of user device 501 and a second user 507 of user device 503, in which both of the users are subscribed to the calendar management platform 103 and have established user profiles. Under this scenario, the first user 505 and second user 507 are defined/tagged as participants of a common group, with the group identifier being deemed as "TEAM." As peers of the common group 510, the first and second users 505 and 507 have assigned roles in relation to one another or the TEAM group 510, which in this case corresponds to that of "Coach" and "Parent" respectively.

In this example, the Parent 507 takes part in their child's little league soccer team and desires to know when games and practices are scheduled to occur. The Coach 505 of the soccer team maintains an online calendar 509 for the team which is accessible from his user device 501 and presentable to the device display. All parents are given the appropriate permissions (e.g., login, password, permissions) for accessing the online calendar 509 maintained by the Coach 505. The Parent 507, however, while having access to the online calendar 509 or an instance thereof typically employs a calendar application 511 integrated on his mobile device 503, which features its own interface characteristics, design features, etc. Although the Coach 505 operates a different calendar application 509 than the parent, both subscribe to the calendar management service for enabling peer coordination of scheduled activities across user, group and application platforms. Hence, in accordance with the exemplary techniques presented earlier, updates to the online calendar 509 (games or practices) are posted to the Parent's 507 mobile phone calendar application 511.

As shown in this example, respective calendar applications 509 and 511 feature different data types and/or formats for presenting specific activities on a calendar view, which in this case is a monthly data view. A data view in the form of a specific calendar entry for the Coach's 505 and Parent's 507 calendar application is also shown as data views 513 and 515 respectively. Data types, corresponding formats and file types for data views 513 and 515 are as follows, per Table 1:

TABLE 1

| Data Type | Coach 505 (file type = *.xml) | Parent 507 (file type = *.wps) |
|---|---|---|
| | Data Format | |
| Calendar Date | Name of Mo DD | MM/DD/YY |
| Time | n (AM/PM) | n (AM/PM) |
| Event Name | Text | Text |
| Location | @ location | (location) |
| Additions | N/A | Content from www.acme_maps.com; alarm |

In an exemplary use case, the Coach 505 updates a game event entry at his web based calendar application 509. The game time scheduled for Sep. 20th is adjusted from 6 PM to 5 PM, as represented in the data view 513 by the strikethrough time entry "6 PM." Once this change is submitted, calendar information representative of the event update is submitted to the calendar management platform 103 for distribution to the TEAM group 510. The calendar management platform 103 translates the calendar information received from the data source (the Coach's calendar application 509) into a format suitable for the Parent's calendar application 511. This includes altering the date at the Parent's calendar application 511 from an erroneous entry of 10/24/10 to that of 10/20/10, adapting the format of the date, adjusting the order of presentment of the activity from that of the Coach's 513 to the Parent's data view 515, etc. In addition, the entry at the Coach's calendar 509 entitled "Hawks vs. Jets" is correlated, by the data correlation module 205, with that of the Parent's entitled "Craig's soccer game" appropriately (e.g., based on shared metadata) to ensure proper alignment of activities.

It is noted that the Coach 505 may also apply various settings to the event, including a priority level, urgency level, reminder setting or alarm, attachment, note, recurrence, etc. In this example, the Coach 505 applies a high priority setting (e.g., level 1) to indicate the priority respective to him and an urgency level indicator 517 of maximum for indicating the importance to all members of the TEAM group 510. The ability of the receiving group members, such as the Parent 507 to apply the urgency settings depends on the limitation and/or features of their respective calendar applications 511. The calendar management platform 103, by way of its various modules, receives settings data as additional metadata and packages and presents it appropriately for the data view of the Parent 515.

The Parent's data view 515, by way of example, presents the entry as updated to their calendar 511, as represented by the strikethrough in the date "10/24/10" and time "5 PM." Reminders/alarm settings 519 are enabled and displayed based on the device 511 alerting capabilities. Also a note 521 is attached and available for execution as a personalized data view to remind the Parent to bring snacks/drinks for after the game. In certain embodiments, depending on device characteristics and services available to a particular user (e.g., Parent 507), a third party data source 117 may supply additional data feeds for presentment or integration to the data view 515. By way of example, a map service may provide navigation/direction based content 119v for the location of the event. The content 119v source is indicated in the Parent's profile data 107a and retrieved appropriately by the data retrieval model 203—i.e., from www.acme_maps.com—for integration with calendar application 511.

It is noted, by way of example, that user 505 has another data view 523 representative of a calendar entry posted to their calendar 509. The use case surrounding this entry is presented with respect to FIG. 5B. Under this scenario, the user 505 is also affiliated with a group 533 entitled "BIZ," where the role of the user 505 within the BIZ (business) group 533 is CEO (Chief Executive Officer) of the Legacy Corporation. Another user 531 that is also a member of the BIZ group 533 has the role of CFO (Chief Financial Officer). The user 505 operates a different calendar application for tracking their business related activities, which in this case is the same application utilized by the second user 531 as part of the workplace. Because the CEO 505 and CFO 531 are configured to the calendar management platform 103, calendar information is shared across user groups and different calendar applications. As a result, changes made to one calendar application of user 505 are translated to the calendar application of associated peers.

For example, when the user 505 in the role of Coach changes the game time from 6 PM to 5 PM, the event conflicts with a client meeting he has set with the CFO 531 in his role as CEO. Although the online calendar 509 is for the team, the user 505 is still presented with a data view 523 based on calendar information provided to the calendar management platform 103 from his business related calendar application (or other data source). Having prioritized the game as high priority and posted the new time of the game, the data view 523 for the client meeting is presented to the user 505 to enable changes to be made. In this example, the user 505 changes the client meeting from 5 PM to 3 PM, as represented by the strikethrough in time "5 PM." This change is recorded by the calendar management platform 103, resulting in an adjustment in the calendar entry for the CFO 531, as represented by the strikethrough time entry 5 PM. Consequently, the data view 537 representative of the entry is presented to reflect the change. As before, data correlation and formatting for presentment with respect to the different calendar application 535 is executed by the calendar management platform 103. For example, the location of the meeting "Office" as indicated in the CEO's data view 523 is correlated as "Legacy Co. Bldg" for presentment with respect to the CFO's data view 537.

It is noted in this example that the CEO 505 is able to review a data view related to the TEAM group 510 event and that of the BIZ group 533 event via a single calendar application 509. Hence, even though the BIZ group 533 event was not originally entered at the online calendar 509, the user 505 is provided with access to this information. Based on the permission settings, the data view regarding the client meeting 523 is restricted from view of the peers associated with the TEAM group 510 with the exception of the user 505. While not shown, it is noted that the CEO 505 may be presented with the opportunity to toggle between various data views via the GUI of his device 501, each data view corresponding to that of a calendar application he employs. Under this scenario, the online calendar 509 for the team could be toggled to a view of the calendar application pertaining to the user's business activities.

The above presented use case is but one of many approaches for enabling application of the techniques and system presented herein. System 100 provides a means of effectively coordinating and synchronizing calendar information while also enabling presentment of data views for different calendar applications employed by one or more users or groups thereof. Changes made at one calendar application are readily accounted for at another calendar application. The following additional use cases present additional of the approaches presented in Table 2:

TABLE 2

Multiple Calendar Copies

Subscribing user(s) can switch between multiple online calendar aggregations by giving permissions to other users to view their calendar
Wall Calendar A Grandmother and Grandfather have a network enabled wall calendar that is supplied by their grandchildren. The calendar is configured to the service provider network 109 and set to periodically synchronize with calendar management platform 103. By way of their subscription, the grandchildren can add items (e.g., events or reminders) to their grandparent's calendar dynamically from their respective calendar applications at their user devices. The grandparents can then keep track of birthdays and anniversaries just as they would a traditional analog calendar.
Medical Reminder When a person goes to the doctor and has outpatient surgery, the doctor subsequently prescribes medications. By way of the calendar management service, the hospital based or proprietary medical scheduling application enables data entries to be delivered directly to the patient's calendar. Pre-operation and Post-operation instructions are presented as a data view corresponding to any of the users different calendar applications, including those accessible from online. The doctor may also add relevant medical reminders and events to the calendar, including checkups, exercise routines, etc.
Family Calendar Each family member maintains their own calendar for tracking personal and business activities. A kitchen wall/fridge calendar, as implemented on a viewing device, may be configured to display a common view of the household's activities with the appropriate level of detail based on respective family member user profiles. By way of example, a Mother can setup a doctor's appt for the children and know they are free and that the Father's schedule indicates he is free to transport them. As another example, the can view the calendar to know what activities his children had been engaged father in while he was at work. Changes in schedule, such as unexpected meetings, can be posted at the Father's work based calendar for effective presentment to the family calendar.
Business Calendar A Project Manager needs to coordinate the activities of multiple team members, some of which are subcontractors/external associates, in order to complete a major project. Using the peer calendar management service, project related meetings for both internal and external (subcontractor) team members can be maintained within clear view regardless of the calendar applications used by the subcontractors. Meeting status and outcomes as recorded by different project management applications of the various team members can be aggregated and correlated with performance metrics for indicating specific project completion milestones and business intelligence information. Meetings can be scheduled on-the-fly by through use of an optional "impromptu function" that determines a best possible opening for enabling as many members of the internal and external team to get together as quickly as possible, the determined time being posted instantly to the differing calendar applications of the users. Security is enhanced as the subcontractors need not be given temporary network permissions, email or server access at the Project Manager's company while still enabling effective coordination and exchange of pertinent calendar information between all parties.

The processes described herein for managing calendar information received from a plurality of data sources may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 6:
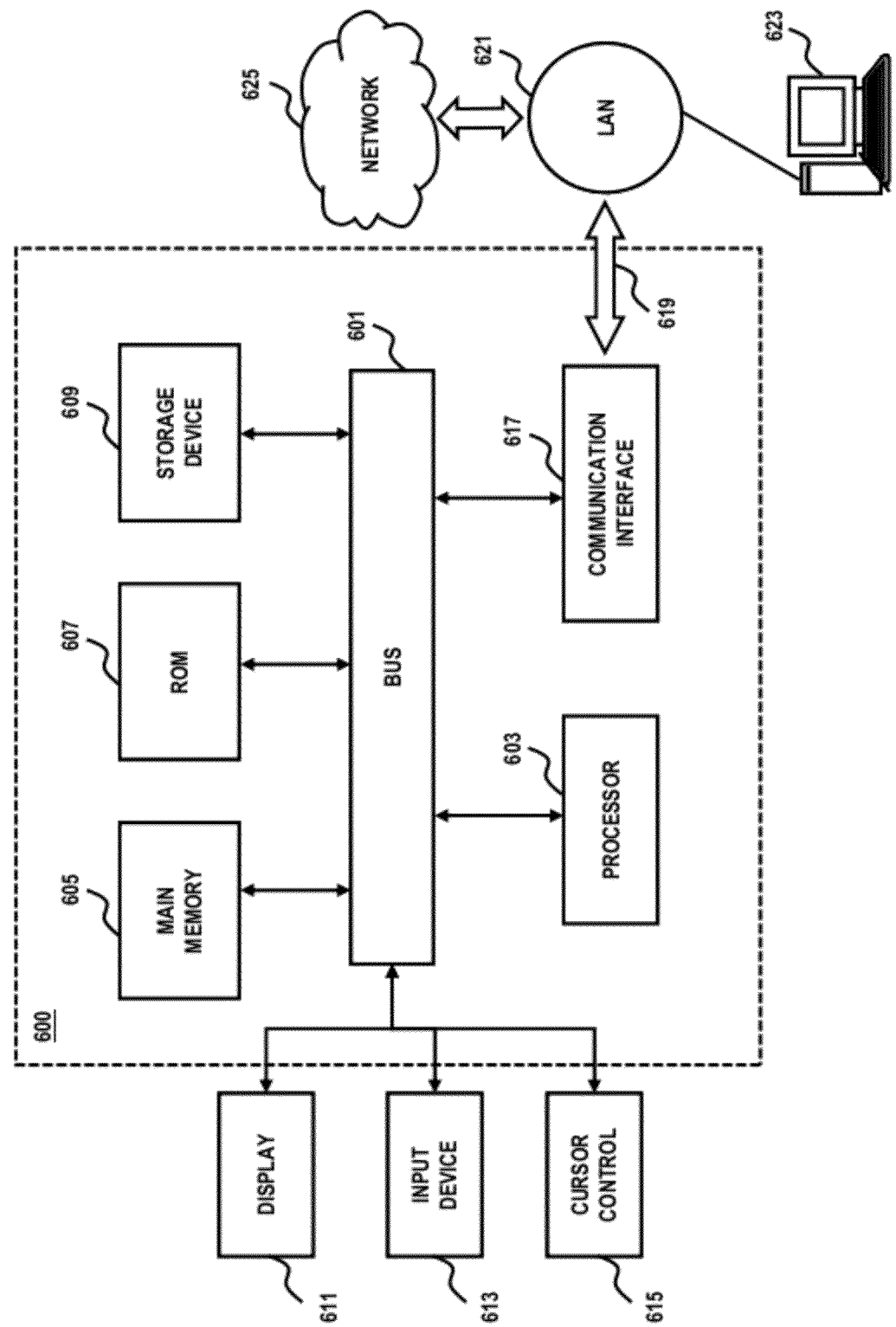
FIG. 6 is a diagram of a computer system that can be used to implement various exemplary embodiments.

FIG. 6 illustrates computing hardware (e.g., a computer system) upon which these embodiments can be implemented. The computer system 600 includes a bus 601 or other communication mechanism for communicating information and a processor 603 coupled to the bus 601 for processing information. The computer system 600 also includes main memory 605, such as random access memory (RAM) or other dynamic storage device, coupled to the bus 601 for storing information and instructions (computer program code) to be executed by the processor 603. Main memory 605 also can be used for storing temporary variables or other intermediate information during execution of instructions by the processor 603. The computer system 600 may further include a read only memory (ROM) 607 or other static storage device coupled to the bus 601 for storing static information and instructions for the processor 603. A storage device 609, such as a magnetic disk or optical disk, is coupled to the bus 601 for persistently storing information and instructions.

The computer system 600 may be coupled via the bus 601 to a display 611, such as a cathode ray tube (CRT), liquid crystal display, active matrix display, or plasma display, for displaying information to a computer user. An input device 613, such as a keyboard including alphanumeric and other keys, is coupled to the bus 601 for communicating information and command selections to the processor 603. Another type of user input device is a cursor control 615, such as a mouse, a trackball, or cursor direction keys, for communicating direction information and command selections to the processor 603 and for controlling cursor movement on the display 611.

According to certain embodiments, the processes described herein are performed by the computer system 600, in response to the processor 603 executing an arrangement of instructions contained in main memory 605. Such instructions can be read into main memory 605 from another computer-readable medium, such as the storage device 609. Execution of the arrangement of instructions contained in main memory 605 causes the processor 603 to perform the process steps described herein. One or more processors in a multi-processing arrangement may also be employed to execute the instructions contained in main memory 605. In alternative embodiments, hard-wired circuitry may be used in place of or in combination with software instructions to implement the embodiment of the invention. Thus, embodiments of the invention are not limited to any specific combination of hardware circuitry and software.

Figure 7:
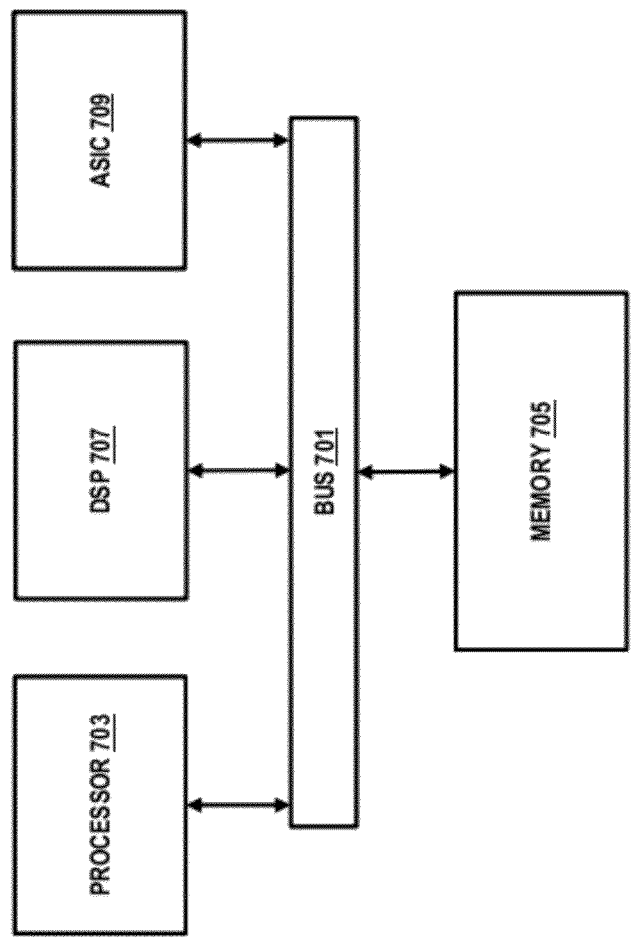
FIG. 7 is a diagram of a chip set that can be used to implement various exemplary embodiments.

The computer system 600 also includes a communication interface 617 coupled to bus 601. The communication interface 617 provides a two-way data communication coupling to a network link 619 connected to a local network 621. For example, the communication interface 617 may be a digital subscriber line (DSL) card or modem, an integrated services digital network (ISDN) card, a cable modem, a telephone modem, or any other communication interface to provide a data communication connection to a corresponding type of communication line. As another example, communication interface 617 may be a local area network (LAN) card (e.g. for Ethernet™ or an Asynchronous Transfer Model (ATM) network) to provide a data communication connection to a compatible LAN. Wireless links can also be implemented. In any such implementation, communication interface 617 sends and receives electrical, electromagnetic, or optical signals that carry digital data streams representing various types of information. Further, the communication interface 617 can include peripheral interface devices, such as a Universal Serial Bus (USB) interface, a PCMCIA (Personal Computer Memory Card International Association) interface, etc. Although a single communication interface 617 is depicted in FIGS. 3 and 7, multiple communication interfaces can also be employed.

The network link 619 typically provides data communication through one or more networks to other data devices. For example, the network link 619 may provide a connection through local network 621 to a host computer 623, which has connectivity to a network 625 (e.g. a wide area network (WAN) or the global packet data communication network now commonly referred to as the "Internet") or to data equipment operated by a service provider. The local network 621 and the network 625 both use electrical, electromagnetic, or optical signals to convey information and instructions. The signals through the various networks and the signals on the network link 619 and through the communication interface 617, which communicate digital data with the computer system 600, are exemplary forms of carrier waves bearing the information and instructions.

The computer system 600 can send messages and receive data, including program code, through the network(s), the network link 619, and the communication interface 617. In the Internet example, a server (not shown) might transmit requested code belonging to an application program for implementing an embodiment of the invention through the network 625, the local network 621 and the communication interface 617. The processor 603 may execute the transmitted code while being received and/or store the code in the storage device 609, or other non-volatile storage for later execution. In this manner, the computer system 600 may obtain application code in the form of a carrier wave.

The term "computer-readable medium" as used herein refers to any medium that participates in providing instructions to the processor 603 for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 609. Volatile media include dynamic memory, such as main memory 605. Transmission media include coaxial cables, copper wire and fiber optics, including the wires that comprise the bus 601. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

FIG. 7 illustrates a chip set 700 upon which an embodiment of the invention may be implemented. Chip set 700 is programmed to present a slideshow as described herein and includes, for instance, the processor and memory components described with respect to FIG. 8 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 700, or a portion thereof, constitutes a means for performing one or more steps of FIGS. 4A-4B.

In one embodiment, the chip set 700 includes a communication mechanism such as a bus 701 for passing information among the components of the chip set 700. A processor 703 has connectivity to the bus 701 to execute instructions and process information stored in, for example, a memory 705. The processor 703 may include one or more processing cores with each core configured to perform independently. A multi-core processor enables multiprocessing within a single physical package. Examples of a multi-core processor include two, four, eight, or greater numbers of processing cores. Alternatively or in addition, the processor 703 may include one or more microprocessors configured in tandem via the bus 701 to enable independent execution of instructions, pipelining, and multithreading. The processor 703 may also be accompanied with one or more specialized components to perform certain processing functions and tasks such as one or more digital signal processors (DSP) 707, or one or more application-specific integrated circuits (ASIC) 709. A DSP 707 typically is configured to process real-world signals (e.g., sound) in real time independently of the processor 703. Similarly, an ASIC 709 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 703 and accompanying components have connectivity to the memory 705 via the bus 701. The memory 705 includes both dynamic memory (e.g., RAM, magnetic disk, writable optical disk, etc.) and static memory (e.g., ROM, CD-ROM, etc.) for storing executable instructions that when executed perform the inventive steps described herein to controlling a set-top box based on device events. The memory 705 also stores the data associated with or generated by the execution of the inventive steps.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
    retrieving at a calendar management platform calendar information associated respectively with a plurality of data sources,
    wherein two or more data sources include a calendar application that are different from one another and that have a data view for the calendar information that are different from one another,
    wherein the retrieving comprises periodically synchronizing with the plurality of data sources, and
    wherein a time for the synchronizing is individually set by each registered user of the calendar management platform via a user profile maintained for said each registered user;
    for each of the data sources, determining, from the calendar information, first metadata specifying a contributor of the corresponding calendar information;
    for each of the data sources, determining, from the calendar information, a second metadata relating to distribution of the calendar information; and
    generating, for each of the two or more data sources, the data view for the retrieved calendar information based on the first metadata and the second metadata,
    wherein, for each of the two or more data sources that include a different calendar application, the generated data view for the retrieved calendar information corresponds to the data view employed by the respective calendar application,
    wherein the retrieving further comprises retrieving calendar information input by one or more registered peers of a registered user at respective user devices for inclusion in the data view for the retrieved calendar information of the registered user, and
    wherein calendar information input by the registered user is retrieved and stored as calendar information in connection with the user profile of the one or more registered peers of the registered user.

2. A method according to claim 1, wherein the data sources correspond respectively to a plurality of devices configured to execute a plurality of calendar applications for outputting the calendar information.

3. A method according to claim 2, further comprising:
    initiating transmission of the data view to the corresponding devices.

4. A method according to claim 1, wherein the first metadata specifies a role of the contributor, an owner of the calendar information, or a combination thereof 5. A method according to claim 1, further comprising:
    for each of the data sources, determining, from the calendar information, a third metadata specifying a filter for a type of event to output to a user group according to the distribution.

6. A method according to claim 1, further comprising:
    receiving a request to subscribe to a calendar service for receiving the data view; and
    receiving information relating to one or more devices configured to output the calendar information.

7. A method according to claim 1, wherein the calendar information includes a plurality of calendar events, the method further comprising:
    tagging the calendar events for classification into one of a plurality of user groups.

8. An apparatus comprising:
    at least one processor; and
    at least one memory including computer program code for one or more programs, the at least one memory and the computer program code configured to, with the at least one processor, cause the apparatus to perform at least the following, retrieve at a calendar management platform calendar information associated respectively with a plurality of data sources, wherein two or more data sources include a calendar application that are different from one another and that have a data view for the calendar information that are different from one another, wherein the retrieving comprises periodically synchronizing with the plurality of data sources, and wherein a time for the synchronizing is individually set by each registered user of the calendar management platform via a user profile maintained for said each registered user;

for each of the data sources, determine, from the calendar information, first metadata specifying a contributor of the corresponding calendar information, for each of the data sources, determine, from the calendar information, a second metadata relating to distribution of the calendar information, and generate, for each of the two or more data sources, the data view for the calendar information based on the first metadata and the second metadata, wherein, for each of the two or more data sources that include a different calendar application, the generated data view for the retrieved calendar information corresponds to the data view employed by the respective calendar application$_s$ wherein the retrieving further comprises retrieving calendar information input by one or more registered peers of a registered user at respective user devices for inclusion in the data view for the retrieved calendar information of the registered user, and wherein calendar information input by the registered user is retrieved and stored as calendar information in connection with the user profile of the one or more registered peers of the registered user.

9. An apparatus according to claim 8, wherein the data sources correspond respectively to a plurality of devices configured to execute a plurality of calendar applications for outputting the calendar information.

10. An apparatus according to claim 9, wherein the apparatus is further caused to:

initiate transmission of the data view to the corresponding devices.

11. An apparatus according to claim 8, wherein the first metadata specifies role of the contributor, an owner of the calendar information, or a combination thereof.

12. An apparatus according to claim 8, wherein the apparatus is further caused to:

for each of the data sources, determine, from the calendar information, a third metadata specifying a filter for a type of event to output to a user group according to the distribution.

13. An apparatus according to claim 8, wherein the apparatus is further caused to:

receive a request to subscribe to a calendar service for receiving the data view; and receive information relating to one or more devices configured to output the calendar information.

14. An apparatus according to claim 8, wherein the calendar information includes a plurality of calendar events, and the apparatus is further caused to:

tag the calendar events for classification into one of a plurality of user groups.

15. A non-transitory computer-readable storage medium carrying one or more sequences of one or more instructions which, when executed by one or more processors, cause the one or more processors to at least perform:

retrieve calendar information associated respectively with a plurality of data sources, wherein two or more data sources include a calendar application that are different from one another and that have a data view for the calendar information that are different from one another;

wherein the retrieving comprises periodically synchronizing with the plurality of data sources, and wherein a time for the synchronizing is individually set by each registered user of the calendar management platform via a user profile maintained for said each registered user;

for each of the data sources, determine, from the calendar information, first metadata specifying a contributor of the corresponding calendar information;

for each of the data sources, determine, from the calendar information, a second metadata relating to distribution of the calendar information; and generate, for each of the two or more data sources, the data view for the calendar information based on the first metadata and the second metadata, wherein, for each of the two or more data sources that include a different calendar application, the generated data view for the retrieved calendar information corresponds to the data view employed by the respective calendar application$_s$ wherein the retrieving further comprises retrieving calendar information input by one or more registered peers of a registered user at respective user devices for inclusion in the data view for the retrieved calendar information of the registered user, and wherein calendar information input by the registered user is retrieved and stored as calendar information in connection with the user profile of the one or more registered peers of the registered user.

16. A non-transitory computer-readable storage medium according to claim 15, wherein the data sources correspond respectively to a plurality of devices configured to execute a plurality of calendar applications for outputting the calendar information.

17. A non-transitory computer-readable storage medium according to claim 15, wherein the first metadata specifies role of the contributor, an owner of the calendar information, or a combination thereof.

18. A non-transitory computer-readable storage medium according to claim 15, wherein the one or more processors are caused, at least in part, to further perform:

determine, from the calendar information, a third metadata specifying a filter for a type of event to output to a user group according to the distribution.

* * * * *